United States Patent [19]
Koch et al.

[11] Patent Number: 5,659,136
[45] Date of Patent: Aug. 19, 1997

[54] METHOD AND DEVICE FOR DETERMINING AN IMBALANCE AND APPLICATION OF THE DEVICE

[75] Inventors: Michael Koch, Osterode; Ruediger Uhlendorf, Niemetal; Ingo Jaeckel, Badenhausen, all of Germany

[73] Assignee: Heraeus Instruments GmbH, Hanau, Germany

[21] Appl. No.: 688,603

[22] Filed: Jul. 30, 1996

[30] Foreign Application Priority Data

Oct. 25, 1995 [DE] Germany ............... 195 39 633.2

[51] Int. Cl.⁶ ................................................ G01M 1/16
[52] U.S. Cl. ........................................ 73/462; 73/466
[58] Field of Search ................... 73/460, 462, 467, 73/471, 862.08, 466; 74/573 R; 416/147; 318/611

[56] References Cited

U.S. PATENT DOCUMENTS

| | | | |
|---|---|---|---|
| 3,812,725 | 5/1974 | Frank et al. | 73/462 |
| 4,423,632 | 1/1984 | Madden et al. | 73/462 |
| 5,412,985 | 5/1995 | Garcia et al. | 73/460 |
| 5,543,698 | 8/1996 | Tau et al. | 73/462 |
| 5,600,062 | 2/1997 | Moench | 73/462 |

FOREIGN PATENT DOCUMENTS

| | | |
|---|---|---|
| 0 097 721 | 1/1984 | European Pat. Off. . |
| 87 08 266.7 | of 0000 | Germany . |
| 1595510 | 8/1981 | United Kingdom . |

Primary Examiner—Hezron E. Williams
Assistant Examiner—Richard A. Moller
Attorney, Agent, or Firm—Workman, Nydegger & Seeley

[57] ABSTRACT

In order to determine an imbalance of a rotor caused to turn by means of a driving arrangement, imbalance-produced deflections or accelerations of the driving arrangement, spring-loaded with respect to a stationary housing, are determined and relayed as an electrical signal to an evaluation device. The sensor may be, for example, a piezoelectric crystal for detection of accelerations of the drive unit caused by imbalance or a path sensor for detection of deflections of the drive unit relative to the housing as a result of imbalance. The signal is evaluated as a function of the rotary speed of the rotor by means of an adaptive band filter. The method is especially suitable for determination of imbalance during operation of laboratory centrifuges, where an imbalance can occur, for example, from breakage of test tubes.

13 Claims, 3 Drawing Sheets

METHOD AND DEVICE FOR DETERMINING AN IMBALANCE AND APPLICATION OF THE DEVICE

BACKGROUND OF THE INVENTION

1. The Field of the Invention

The invention is directed to methods and apparatus for determining when a rotor, caused to rotate by means of a driving arrangement, becomes imbalanced. In particular, the rotor imbalance is determined by sensor means, mechanically connected to the driving arrangement, for sensing a predetermined movement of the driving arrangement and for relaying the sensed movement to evaluation means for determining when the sensed movement indicates rotor imbalance. Response elements generate a warning signal and/or a switch-off signal in response to either rotor imbalance or disruption of the rotor imbalance sensor means.

2. The Relevant Technology

There are many devices which utilize some type of rotating component and, particularly, some type of motor-driven rotor. Imbalance of such a rotor can occur for many reasons and can cause numerous problems including inoperability or defective performance of the device. Rotor imbalance may also cause damage or destruction to the rotor and/or other components of the device. Thus, means for determining when a rotor has become imbalanced, and for switching off a device when rotor imbalance occurs, would be helpful in many devices.

An example of a device having a rotor is a laboratory centrifuge device. It is known from EP 0 455 878 A3 to provide a laboratory centrifuge device with a switch element, forming a unit together with an imbalance element fastened to a drive unit. When imbalanced motions work themselves out into large deflections of the drive unit, a receptacle with a switch fluid located inside opens or closes an electrical transmission pathway by deflection and thus puts out a switch signal for the existing imbalance.

Another example of a device having a rotor is an automatic washing machine. An arrangement for restricting imbalance in fully automatic washing machines is known from DE 31 41 684 A1, in which a bead of mercury, oscillating attenuated in deep resonance, which initiates a contacting process with a pin to thereby effect switching of the drive elements when the maximum permissible imbalance is achieved.

According to the known methods of detecting imbalance, a large deflection of rotors, such as the deflection caused by imbalance in the lower speed range, are detectable by mechanical or electronic sensors. Detection difficulties, however, occur at higher speeds. For example, at high speed, mechanical sensors cannot put out sufficient amplitudes, since the gyroscopic procession produced by the rotor may either increase or decrease the amount of deflection, and thus the triggering of the imbalance will be premature or not occur at all. Moreover, a large mount of adjustment is also necessary for mechanical imbalance sensors.

An example of a particular problem is breakage of the sample containers, often glass tubes, within a laboratory centrifuge device. Such breakage represents a physical hazard to a centrifuge operator and, depending on the nature of the sample material, may also represent a biological hazard. Because the broken sample containers cause rotor imbalance, reliable detection of the rotor imbalance would serve to warn the operator of the possibility of broken sample containers.

It will be appreciated that it would be an advancement in the art to provide methods and apparatus permitting detection of rotor imbalance over the entire speed range of a device having a rotor and, in particular, permitting reliable detection of rotor imbalance at higher speeds.

SUMMARY AND OBJECTS OF THE INVENTION

It is an object of the present invention to provide methods and apparatus for detecting rotor imbalance, over the entire speed range of a device having a rotor. In particular, it is an object of the invention to provide methods and apparatus for reliably detecting rotor imbalance high rotor speeds.

It is another object of the present invention to provide methods and apparatus for generating an immediate warning signal and/or a switch-off signal in response to the detection of rotor imbalance. In addition, it is an object of the present invention to also generate an immediate warning signal and/or switch-off signal in response to detection of disruption of the rotor imbalance sensor means. Accordingly, a high degree of intrinsic safety is achieved.

It is yet another object of the present invention to provide apparatus for detecting rotor imbalance which can be easily calibrated during manufacture. In particular, the basic setting can adjust the calibration without alignment with just two trial runs, one normal run and one imbalance run.

These and other objects and features of the present invention will become more fully apparent from the following description and appended claims, or may be learned by the practice of the invention as set forth hereinafter.

To achieve the foregoing objects, and in accordance with the invention as embodied and broadly described herein, the present invention describes methods and apparatus for determining when a rotor, caused to rotate by means of a rotor driving arrangement becomes imbalanced. In particular, the method for determining rotor imbalance comprises employing movement sensor means, mechanically connected to the rotor driving arrangement, for sensing a predetermined movement of the rotor driving arrangement and for relaying the sensed movement, as an electrical signal, to signal evaluation means for determining when the sensed movement indicates rotor imbalance. For example, movement of the rotor driving arrangement may be detected by movement sensor means comprising a piezoelectric crystal adapted to sense acceleration of the rotor driving arrangement restrained by elastic support elements to a stationary housing. Alternatively, the movement sensor means may comprise a path sensor adapted to sense deflection of the elastically-suspended rotor driving arrangement with respect to the stationary housing.

An electrical control signal characterizing the rotor speed is generated by a rotor speed sensor and is also relayed to the signal evaluation means such that the sensed movement of the driving arrangement is evaluated as a function of the rotary speed of the rotor. For example, the rotor speed signal may be derived from the power supply of the driving arrangement or may be detected photoelectrically. The signal evaluation means comprises an adaptive band pass filter which receives the electrical signal from the movement sensor means and the electrical control signal from the rotor speed sensor. The electrical control signal corresponding to the rotor speed is used as the center frequency of the adaptive band pass filter. The output of the adaptive band pass filter is relayed to signal evaluation circuitry. Because the sensed movement of the rotor driving arrangement is evaluated as a function of the rotary speed, relatively large movements such as may occur, for example, during startup of a laboratory centrifuge device in the critical speed range, are properly evaluated and do not elicit any alarm.

The device in accord with the present invention comprises, in addition to movement sensor means for sensing a predetermined movement of the rotor driving arrangement and an adaptive band pass filter between the movement sensor means and the signal evaluation circuitry, an imbalance response element for generating an alarm and/or for switching off the device when rotor imbalance occurs. In addition, the device preferably further comprises a safety response element for generating an alarm and/or switching off the device if disruption of the movement sensor means occurs.

The movement sensor means may comprise, for example, a piezoelectric crystal adapted to transform mechanical forces produced by acceleration of the driving arrangement restrained by elastic support elements to a stationary housing into an electrical signal or a path sensor adapted to sense changes in distance between the elastically-suspended driving arrangement with respect to the stationary housing. A rotor speed sensor generates an electrical control signal corresponding to the rotor speed which is sent to the adaptive band pass filter. The adaptive band pass filter is preferably a digital filter which is especially advantageous due to its easy adjustability. The output of the adaptive band pass filter is relayed to the signal evaluation circuitry which is connected to the imbalance response element for generating alarm signal and/or a switch-off signal to the rotor driving arrangement in response to rotor imbalance. Preferably, the signal evaluation circuitry comprises a rectifier and a differential element.

A preferred use for the methods and apparatus of the present invention is to operate a laboratory centrifuge device. The relatively simple equipment proves to be especially advantageous here, since the determination of speed of rotation by means of sensor is already available in modem centrifuges and thus only a slight addition to the circuit arrangement is required.

BRIEF DESCRIPTION OF THE DRAWINGS

In order that the manner in which the above-recited and other advantages and objects of the invention are obtained, a more particular description of the invention briefly described above will be rendered by reference to specific embodiments illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
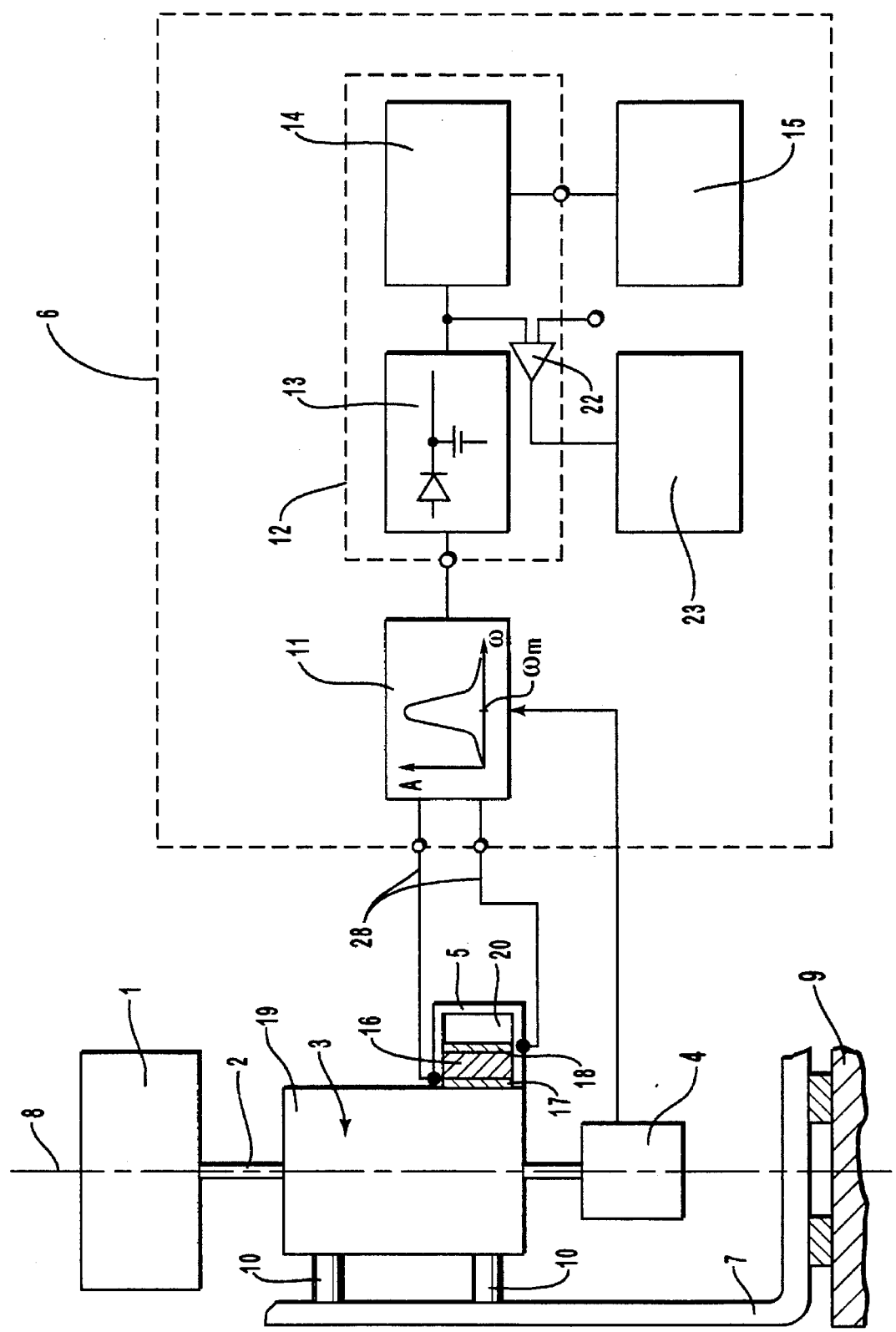
FIG. 1 shows schematically the essential structural elements of a conventional laboratory centrifuge with its schematically represented housing, as well as the corresponding circuit arrangement, a sensor being used to detect accelerations caused by imbalance of the rotor.

According to FIG. 1, a device, such as a laboratory centrifuge device, having a rotor 1, a rotor driving arrangement 3 connected to the rotor shaft 2, along with a rotor speed sensor 4 is schematically illustrated. Movement sensor means, mechanically connected to the rotor driving arrangement 3, for sensing a predetermined movement of the rotor driving arrangement and for relaying the sensed movement, as an electrical signal, to signal evaluation means (schematically represented as a block diagram within the broken-line box designated as 6) for determining when the sensed movement indicates rotor imbalance, are arranged in a stationary housing 7, represented here in only fragmentary manner, which rests on a fixed support 9. The rotor driving arrangement 3, for purpose of support, is connected to the stationary housing 7 by means of elastically deformable support elements 10 (for example, rubber cushions), shown here only schematically. The rotor axis running along the rotor shaft 2 is shown as a broken line, designated as 8.

In order to determine an imbalance in the area of the rotor 1, the rotor driving arrangement 3 is mechanically firmly connected to the movement sensor means which may comprise, for example, means for detecting acceleration of the rotor driving arrangement or for detecting deflection of the rotor driving arrangement with respect to the stationary housing. As shown in FIG. 1, the movement sensor means may comprise an acceleration sensor 5, which is configured as a piezo-crystal 16 which transforms the forces acting on it into electrical signals. Piezo-crystal 16 is surrounded by two opposite electrodes 17, 18 to measure the piezo-voltage and is firmly connected to the housing 19 of the rotor driving arrangement 3, while on the side away from the rotor driving arrangement 3, a mass element 20 is connected to the surface of the piezo-crystal or one of the electrodes in order to apply the mechanical forces produced by imbalance.

At the same time, the rotor shaft 2 is connected to a rotary speed pickup, or tachogenerator, as the rotor speed sensor 4, so that the acceleration caused by rotor imbalance can be evaluated independently of rotor speed. An electrical control signal corresponding to the rotor speed of the driving arrangement is transmitted to an adaptive band pass filter 11, on which (in the schematic representation of the characteristic) the rotor speed or angular velocity is plotted along the $\omega$ axis, while the acceleration detected by acceleration sensor 5 is sent in the form of voltage signals to the adaptive band pass filter 11. The amplification, A, of the filter or the ratio between the output and the input amplitude is plotted as a function of the rotor speed or angular velocity, $\omega$. Thus, this is a band pass filter 11 with variable center frequency $f_m = \omega_m/2p$.

The output of the adaptive band pass filter 11 is connected to signal evaluation circuitry schematically represented as a block diagram within the broken-line box designated as 12. At the input of the signal evaluation circuitry is placed a rectifier 13, whose output is connected to the input of a differentiation element 14, in order to reliably and automatically detect sudden changes in the amplitude of the signal. At the output of the differential element 14 is hooked up an imbalance response element 15 comprising a circuit arrangement adapted to generate an optical or acoustic wanting and/or a switch-off function should rotor imbalance be detected.

Furthermore, in order to monitor the continued operation of the movement sensor means, i.e., the acceleration sensor 5 and its connection 28 to the signal evaluation means 6, a comparator 22 is connected by its first input to the rectifier 13 of the signal evaluation circuitry 12. The comparator 22 monitors the ground oscillation, i.e., oscillation which occurs as a result of a manufacturing-related imbalance tolerances of rotor 1 and rotor driving arrangement 3, determined by means of acceleration sensor 5, by comparing with a reference signal at its second input. The output of the comparator 22 is connected to a safety response element 23 comprising a circuit arrangement adapted to generate an optical or acoustic warning and/or a switch-off function should disappearance of the ground oscillation signal occur.

The warning function has proven to be especially important with respect to hazardous test tube contents in laboratory centrifuge devices, since the attending personnel can be warned in advance when test tubes are broken. Furthermore, a special advantage should be seen in the fact that the movement of the rotor driving arrangement can be evaluated as a function of the rotor speed, so that relatively large movements, i.e. deflections or accelerations, such as may occur during start up in the critical speed range of laboratory centrifuge devices, do not elicit any alarm.

For illustration, the method is briefly explained hereafter with respect to a laboratory centrifuge device. It will be appreciated that the methods and apparatus of the present invention are applicable to other devices having rotors as well.

During normal centrifuge operation, the rotor 1 turns as a result of being driven by the rotor driving arrangement 3, which can be, for example, an electric motor with a power supply, while at the same time the rotor speed $\omega$ is determined by means of the rotor speed sensor 4 and sent as an electrical control signal to the adaptive band pass filter 11. In practice, the rotor 1 generally maintains a speed of 3000 revolutions per minute, which in the case of a rotary-phase induction motor corresponds to an imbalance-created oscillation frequency of 50 Hertz. At the same time, the movement sensor means determines any deflections or accelerations of the rotor driving arrangement 3, spring-loaded by means of elastic support elements 10 with respect to the stationary housing 7, as a result of rotor imbalance form breakage of test tube glass inside the rotor 1, as well as resonance effects while running up in the centrifuge mode.

With increasing speed, the oscillatory frequency also shifts from 0 to a value of, e.g., 50 Hertz, which corresponds to a rotor speed of 3000 revolutions per minute. During normal operation, the movement sensor means detects, by virtue of manufacturing-related imbalance tolerances, a so-called ground oscillation amplitude, as a signal which indicates proper readiness of the sensor arrangement. In the case of rotors loaded with test tubes, considerable accelerations arise by virtue of the imbalance of the rotor 1 on the rotor drive arrangement 3, which are detected by the movement sensor means and transformed into electrical voltage signals. These are taken via connection 28 to the adaptive band pass filter 11, whose filter characteristics, i.e., the ratio between the output and the input amplitude, A, can vary in dependence on the rotor speed $\omega$. After going through the band pass filter 11, the electrical signals are relayed to the signal evaluation circuitry 12, the signal amplitude being transformed by the rectifier 13 into a voltage value, which serves as a measure of the imbalance, or also for representing the condition of operational readiness. The rectified signal is relayed on to the differential element 14.

If the rectified signal remains approximately equal in its amplitude, no change is registered in the differential element 14 and the value 0 is put out to the imbalance response element 15. If, instead, the imbalance of the rotor changes, e.g., in consequence of glass breakage, this imbalance is recognized from the change in the signal amplitude put out by adaptive band pass filter 11 and rectifier 13 such that a trigger signal is put out by differential element 14 to imbalance response element 15. The trigger signal causes generation of a warning signal, such as an acoustic or optical signal, by imbalance response element 15. If desired, either alternatively or in addition to the waring signal, imbalance response element 15 may undertake the switching off of rotor driving arrangement 3.

A similar effect is achieved, for example, when connection 28 leading from the electrodes of the piezo-crystal to the band pass filter 11 is interrupted, since an interruption of the signal constantly put out by the acceleration sensor 5 is recognized by comparator 22 connected to the rectifier 13 and a trigger signal is immediately relayed to the safety response element 23, which operates in a manner similar to imbalance response element 15. Thus, the centrifuge operator is informed as to the condition of the device by generation of either, or both, a warning signal or shutoff of the rotor driving arrangement 3. It has proven to be especially advantageous that the operational readiness of the rotor imbalance detection is constantly monitored, thus achieving a high degree of intrinsic safety in practice.

Figure 2:
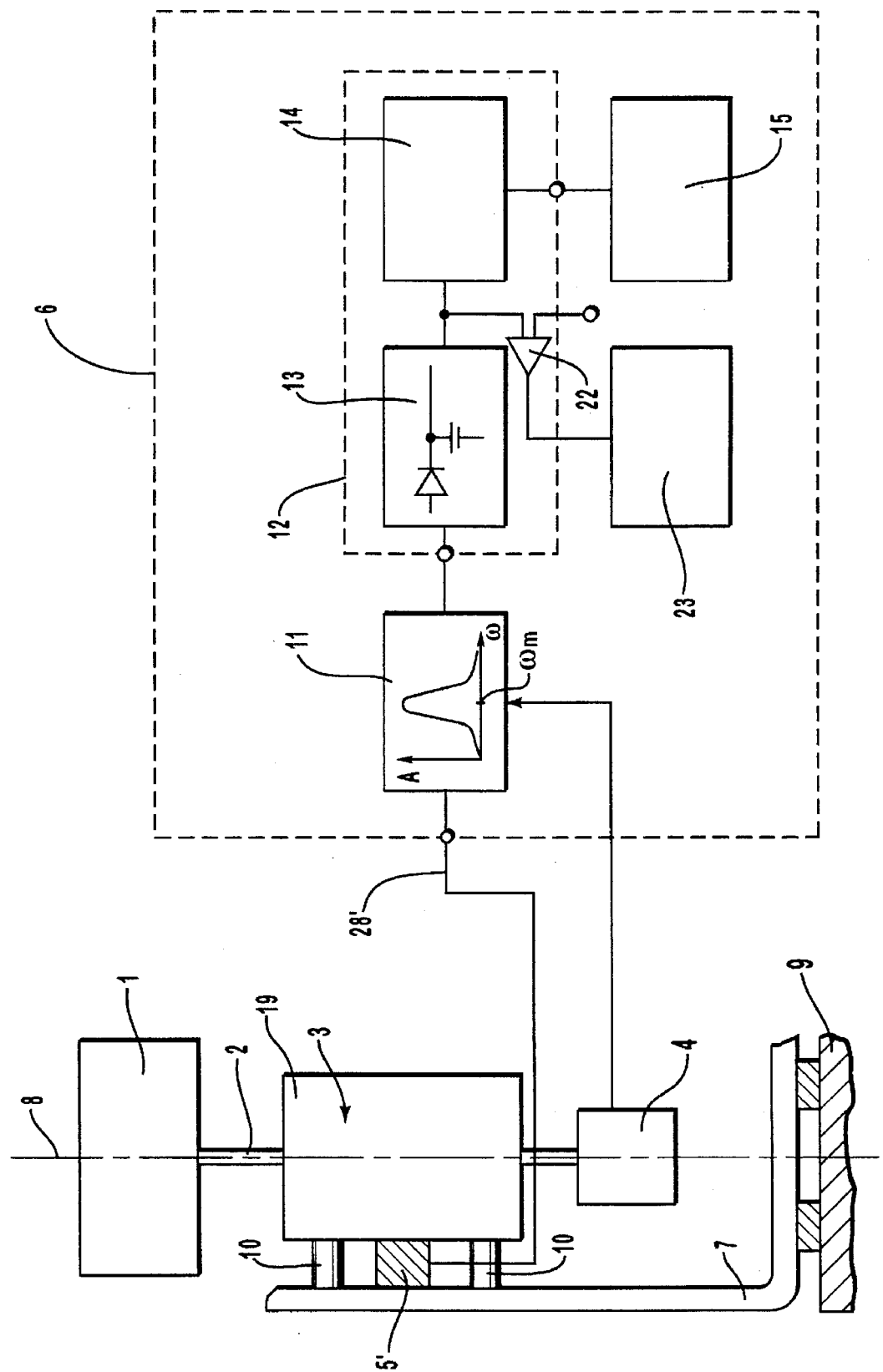
FIG. 2 shows a similar arrangement as depicted in FIG. 1, but instead of a sensor to detect accelerations, a path sensor is used to determine changes in position between the rotor driving arrangement and the housing caused by rotor imbalance.

According to FIG. 2, it is possible to use, as the movement sensor means, a so-called path sensor 5', which is fastened by one end to the rotor driving arrangement 3 and by its other end to the stationary housing 7 of the overall device, shown in fragmentary manner. Changes in position due to rotor imbalance are manifested as changes in distance between stationary housing 7 and the rotor driving arrangement 3, spring-loaded by elastic support elements 10, which are detected by the path sensor 5', e.g., an optoelectronic sensor, and transformed into an electrical signal. Further processing of the signal occurs in the same manner as already described with respect to FIG. 1, i.e., the signal is relayed via connection 28', through adaptive band pass filter 11 to signal evaluation circuitry 12, to which the imbalance response element 15 and safety response element 23 are connected.

Figure 3:
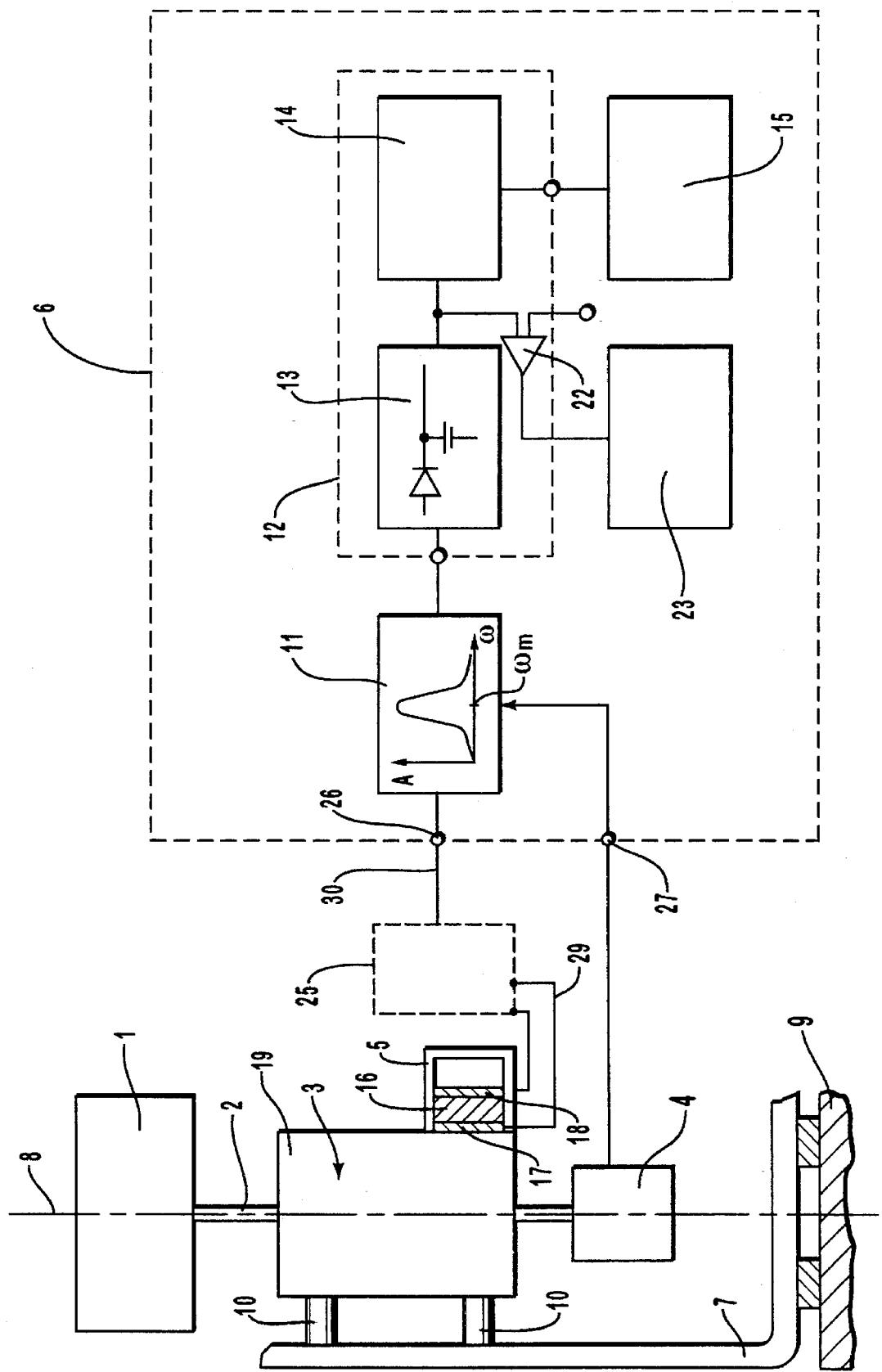
FIG. 3 shows a similar arrangement to FIG. 1, but here the structural elements of the circuit arrangement, formerly shown discretely, or their respective functions, are replaced by processing of encoded signals in a storage-programmable digital computer; this means that the structural elements and their functions are represented by computer programs or software.

According to FIG. 3, furthermore, it is possible to replace the circuit arrangements per FIG. 1 by a program-controlled digital computer, in which case an analog/digital converter 25 is connected to acceleration sensor 5 via line 29, changing the voltage signals generated in the acceleration sensor 5 into digital values and sending these via line 30 to the input 26 of the signal evaluation means 6, fashioned as a programmable digital computer. Furthermore, rotor speed sensor 4 generates an optoelectronic pulse sequence relayed via input 27 to signal evaluation means 6. In a preferred embodiment, the former structural elements shown in FIG. 1, such as adaptive band pass filter 11, rectifier 13, differential element 14, comparator 22, and the imbalance response element 15 and safety response element 23 are represented by programming of the computer.

Furthermore, it is also possible to provide the arrangement discussed by means of FIG. 2 with a programmable digital computer, as represented in FIG. 3, in which case path sensor 5' optoelectronically detects change in the distance between stationary housing 7 and the rotor driving arrangement 3, spring-loaded by means of elastic support elements 10, and sends the signal to the analog/digital converter 25 where it is taken by means of line 30 to the input 26 of the signal evaluation means 6 fashioned as a programmable digital computer.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for determining an imbalance of a rotor caused to rotate by means of a rotor driving arrangement, said method comprising the steps of:
 a) connecting movement sensor means for generating an electrical signal corresponding to a selected movement of said rotor driving arrangement to said rotor driving arrangement;
 b) relaying said electrical signal to signal evaluation means for determining when said movement exceeds a predetermined value indicating rotor imbalance;
 c) generating an electrical control signal corresponding to the speed of said rotor;
 d) relaying said electrical control signal to said signal evaluation means to thereby permit said electrical signal generated by said movement sensor means to be evaluated as a function of rotor speed;
 e) relaying said electrical control signal to an adaptive band pass filter, said electrical control signal being utilized as the center frequency for said adaptive band pass filter, said adaptive band pass filter generating a signal amplitude;
 f) relaying said signal amplitude to a rectifier for transformation into a rectified voltage value;
 g) relaying said rectified voltage value to a differential element whereas a trigger signal is transmitted to a warning- or to switching-off unit in response to a predetermined change in rectified voltage value.

2. A method as in claim 1, wherein said rotor driving arrangement is elastically suspended from a stationary housing and said movement sensor means comprises a piezoelectric crystal adapted to generate an electrical signal corresponding to acceleration of said rotor driving arrangement.

3. A method as in claim 1, wherein said rotor driving arrangement is elastically suspended from a stationary housing and said movement sensor means comprises a path sensor adapted to generate an electrical signal corresponding to deflections between said rotor driving arrangement and said stationary housing.

4. A method as in claim 1 wherein said electrical control signal is derived from a rotor speed sensor coupled to a power supply for said rotor driving arrangement.

5. A method as in claim 4 herein said electrical control signal is detected photoelectrically.

6. A device for determining an imbalance of a rotor caused to rotate by means of a rotor driving arrangement, said device comprising:
 a) movement sensor means, connected to said rotor driving arrangement, for generating an electrical signal corresponding to a selected movement of said rotor driving arrangement;
 b) an adaptive band pass filter connected to said movement sensor means for filtering said electrical signal;
 c) rotor speed sensor that generates an electrical control signal corresponding to the speed of said rotor and a connection for relaying said electrical control signal to said adaptive band pass filter, said electrical control signal being utilized as the center frequency for said adaptive band pass filter to permit said electrical signal generated by said movement sensor means to be evaluated as a function of the rotor speed;
 d) signal evaluation means, connected to said adaptive band pass filter, for determining when said electrical signal indicates rotor imbalance, said signal evaluation means comprising a rectifier for generating a rectified signal; and
 e) an imbalance response element connected to said signal evaluation means, said imbalance response element comprising electrical circuitry for generating a warning signal and/or a switch-off signal in response to a temporal change of the rectified signal.

7. A device as described in claim 6, wherein said rotor driving arrangement is elastically suspended from a stationary housing and said movement sensor means comprises a piezoelectric crystal adapted to generate an electrical signal corresponding to acceleration of said rotor driving arrangement.

8. A device as described in claim 6, wherein said rotor driving arrangement is elastically suspended from a stationary housing and said movement sensor means comprises a path sensor adapted to generate an electrical signal corresponding to deflections between said rotor driving arrangement and said stationary housing.

9. A device as described in claim 6 wherein said rotor driving arrangement comprises an electric motor and said rotor speed sensor photoelectrically derives said electrical control signal from the speed of said electric motor.

10. A device as described in claim 6 wherein said adaptive band pass filter is a digital filter.

11. A device as described in claim 6 further comprising a safety response element connected to said signal evaluation means, said safety response element comprising electrical circuitry for generating a warning signal and/or a switch-off signal in response to disappearance of the electrical signal generated by the movement sensor means.

12. A device as described in claim 6 further comprising a differential element.

13. A device as described in claim 12 further comprising a comparator.

* * * * *